United States Patent
Bawa

(10) Patent No.: US 10,008,928 B2
(45) Date of Patent: Jun. 26, 2018

(54) ENHANCED SWITCHED CAPACITOR FILTER (SCF) COMPENSATION IN DC-DC CONVERTERS

(71) Applicant: INTERSIL AMERICAS LLC, Milpitas, CA (US)

(72) Inventor: Gaurav Bawa, Bridgewater, NJ (US)

(73) Assignee: INTERSIL AMERICAS LLC, Milpitas, CA (US)

( * ) Notice: Subject to any disclaimer, the term of this patent is extended or adjusted under 35 U.S.C. 154(b) by 55 days.

(21) Appl. No.: 14/989,619

(22) Filed: Jan. 6, 2016

(65) Prior Publication Data
US 2017/0047843 A1  Feb. 16, 2017

Related U.S. Application Data

(60) Provisional application No. 62/205,230, filed on Aug. 14, 2015, provisional application No. 62/253,644, filed on Nov. 10, 2015.

(51) Int. Cl.
*H02M 3/156* (2006.01)
*H02M 1/00* (2006.01)

(52) U.S. Cl.
CPC .... *H02M 3/156* (2013.01); *H02M 2001/0025* (2013.01); *H02M 2003/1566* (2013.01)

(58) Field of Classification Search
None
See application file for complete search history.

(56) References Cited

U.S. PATENT DOCUMENTS

| 5,490,055 A | * | 2/1996 | Boylan | H02M 3/156 323/285 |
|---|---|---|---|---|
| 7,619,474 B2 | | 11/2009 | Fukukaza | |
| 7,782,042 B2 | | 8/2010 | Fukuzawa | |

(Continued)

OTHER PUBLICATIONS

Keller, Mattias et al., "A Comparative Study on Excess-Loop-Delay Compensation Techniques for Continuous-Time Sigma-Delta Modulators", Dec. 12, 2008, pp. 1-8, vol. 55, No. 11, Publisher: IEEE Transactions on circuits and Systems—I, Published in: US.

(Continued)

*Primary Examiner* — Jeffrey Gblende
(74) *Attorney, Agent, or Firm* — Foley & Lardner LLP; Mark J. Danielson

(57) ABSTRACT

A system, DC-DC converter, and compensation method and circuit for a DC-DC converter are disclosed. For example, a compensation circuit for a DC-DC converter is disclosed. The compensation circuit includes an integrator circuit configured to receive and integrate a first voltage signal, a differential difference amplifier circuit coupled to the integrator circuit and configured to generate a first filter transfer function associated with the integrated first voltage signal, and a switched capacitor filter circuit coupled to the differential difference amplifier circuit and configured to generate a second filter transfer function, wherein the differential difference amplifier is further configured to output a second voltage signal responsive to the first filter transfer function and the second filter transfer function. In one implementation, the compensation circuit is a type-III switched capacitor filter (SCF) compensation circuit.

14 Claims, 5 Drawing Sheets

(56) References Cited

U.S. PATENT DOCUMENTS

| | | | |
|---|---|---|---|
| 7,845,227 B2 | 12/2010 | Fukuzawa | |
| 7,870,786 B2 | 1/2011 | Fukuzawa | |
| 7,893,766 B1 * | 2/2011 | Cranford, Jr. | H03F 1/3211 330/258 |
| 8,754,699 B2 | 6/2014 | Bawa et al. | |
| 8,768,998 B1 | 7/2014 | Dasgupta et al. | |
| 2006/0006933 A1 * | 1/2006 | Nguyen | H03F 1/32 330/10 |
| 2006/0173364 A1 * | 8/2006 | Clancy | A61B 5/04 600/485 |
| 2009/0273386 A1 * | 11/2009 | Korobeynikov | G06G 7/186 327/337 |
| 2010/0164491 A1 | 7/2010 | Kejik et al. | |
| 2011/0221518 A1 * | 9/2011 | Romero | H03H 19/004 327/554 |
| 2013/0002212 A1 * | 1/2013 | Fan | H02M 3/1588 323/235 |
| 2013/0265035 A1 * | 10/2013 | Mazzarella | G01R 19/0092 324/123 R |
| 2014/0097881 A1 * | 4/2014 | Lynch | H03K 5/086 327/312 |

OTHER PUBLICATIONS

Pavan, Shanthi, "Excess Loop Delay Compensation in Continuous-Time Delta-Sigma Modulators", Dec. 10, 2008, pp. 1-5, vol. 55, No. 11, Publisher: IEEE Transactions on Circuits and Systems—II, Published in: US.

Sai, Akihide et al., "A Digitally Stabilized Type-III PLL Using Ring VCO with 1.01 psrms Integrated Jitter in 65nm CMOS", Feb. 21, 2012, pp. 1-3, Publisher: 2012 IEEE International Solid-State Circuits Conference, Published in: San Francisco, CA.

Wang, Kevin et al., "A Discrete-Time Model for the Design of Type-II PLLs With Passive Sampled Loop Filters", Feb. 28, 2011, pp. 264-275, vol. 58, No. 2, Publisher: IEEE Transactions on Circuits and Systems—I, Published in: US.

Bawa, "Switched-Capacitor Filter Based Type-III Compensation for Voltage-Mode Control of Switched-Mode Buck Converters", 2013, pp. i-137.

Bawa et al., "Switched-Capacitor Filter based Type-III Compensation for switched-mode Buck Converters", "Custom Integrated Circuits Conference", Sep. 22-25, 2013, pp. 1-4, Publisher: IEEE.

Cheng et al., "A 10/30 MHz Fast Reference-Tracking Buck Converter With DDA-Based Type-III Compensator", "IEEE Journal of Solid-State Circuits", Dec. 2014, pp. 2788-2799, vol. 49, No. 12.

Temes et al., "Switched-Capacitor Filter Design Using the Bilinear z-Transform", "IEEE Transactions on Circuits and Systems", Dec. 1978, pp. 1039-1044, vol. CAS-25, No. 12, Publisher: IEEE.

* cited by examiner

ENHANCED SWITCHED CAPACITOR FILTER (SCF) COMPENSATION IN DC-DC CONVERTERS

CROSS-REFERENCE TO RELATED APPLICATIONS

This application is related to U.S. Provisional Patent Application Ser. No. 62/205,230 entitled "ENHANCED SWITCHED CAPACITOR FILTER (SCF) COMPENSATION IN DC-DC CONVERTERS," filed on Aug. 14, 2015, and to U.S. Provisional Patent Application Ser. No. 62/253,644 entitled "ENHANCED SWITCHED CAPACITOR FILTER (SCF) COMPENSATION IN DC-DC CONVERTERS," filed on Nov. 10, 2015, both of which are incorporated herein by reference. This application hereby claims to the benefit of U.S. Provisional Patent Application Ser. No. 62/205,230 and 62/253,644.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings.

DETAILED DESCRIPTION

Figure 1:
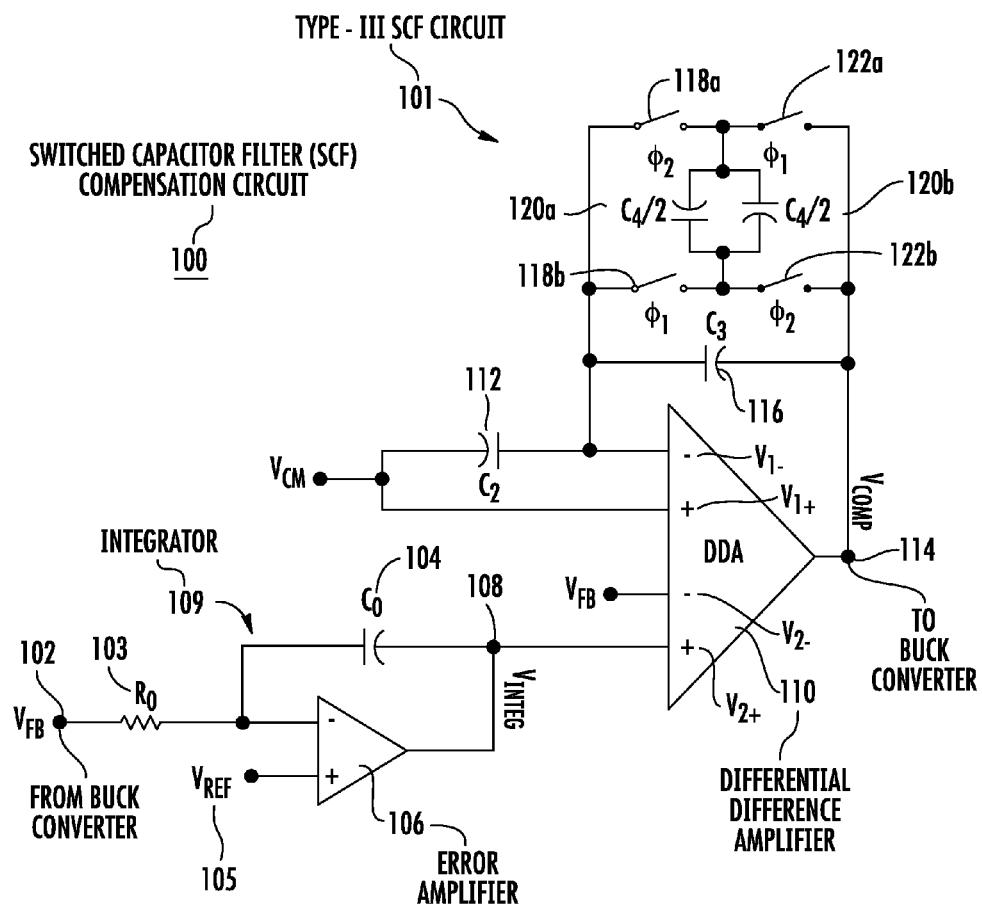
FIG. 1 depicts a schematic circuit diagram of a switched capacitor filter (SCF) compensation circuit that can be utilized to implement one exemplary embodiment of the present invention.

In the following detailed description, reference is made to the accompanying drawings that form a part hereof, and in which are shown by way of specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be construed in a limiting sense. Wherever possible, the same or like reference numbers are used throughout the drawings to refer to the same or like structural components or parts.

Certain DC-DC converters (e.g., step-down or buck converters) commonly utilize a compensation filter or "feedback amplifier" for closed-loop regulation so that the feedback network gain and phase as a function of frequency ensure that the overall system with feedback remains stable. For example, certain buck converters include Type-III Switched Capacitor Filter (SCF) compensation to ensure that their stability, transient response and closed loop performance meets the requirements imposed by the overall systems involved. Nevertheless, a significant problem with these buck converters is that one or more sample and hold amplifier (SHA) stages are needed to operate the SCF circuit and prevent aliasing distortion. Each SHA stage adds a phase lag of T/2 (where T is the sampling period of the SCF) to the feedback loop, which is highly undesirable in such a closed loop system because the phase lag directly and negatively impacts the stability, transient response and thus the closed loop performance of the buck converter and system involved. Also, each SHA stage increases the footprint, power consumption and cost for the dies on which the SCF compensation circuits are formed. Furthermore, the existing SCF compensation circuits generate a complex, high frequency pole, which further degrades their closed loop performance and thus the stability and performance of the buck converters involved. Finally, this high frequency pole requires the utilization of high bandwidth amplification circuitry in the SCF compensation circuits involved, which results in much higher power dissipation requirements than desired. Nevertheless, as described below, the present invention resolves these and other, related problems with enhanced Type-III SCF compensation in buck converters formed on integrated circuits, wafers, chips or dies.

FIG. 1 depicts a schematic circuit diagram of a switched capacitor filter (SCF) compensation circuit 100, which can be utilized to implement one exemplary embodiment of the present invention. In the exemplary embodiment shown, the SCF compensation circuit 100 includes a "delay-free" Type-III SCF circuit with a continuous-time integrator front-end. A differential difference amplifier (DDA) with two pairs of differential inputs is utilized in the SCF compensation circuit 100 to realize a type-III filter transfer function, which enables the implicit cascading of the transfer functions realized at the two differential input pairs of the DDA. Consequently, the embodiment depicted in FIG. 1 can be utilized as a compact discrete-time filter, which eliminates the need for SHA stages, high bandwidth amplification stages, and the complex, high frequency poles generated in the existing SCF compensation circuits.

Specifically, referring to FIG. 1, the SCF compensation circuit 100 receives a voltage feedback signal, $V_{FB}$, at an input 102, which is coupled to the first terminal of a resistor $R_0$ 103. In this embodiment, the voltage feedback signal, $V_{FB}$, is coupled to the resistor $R_0$ 103 from the output terminal of a voltage-controlled, switched-mode pulse-width-modulation (PWM) buck converter. In a second embodiment, for example, the voltage feedback signal, $V_{FB}$, can be coupled to the resistor $R_0$ 103 from the output terminal of a switched-mode PWM boost converter, or the output node of any other suitable DC-DC voltage converter. In any event, the second terminal of the resistor $R_0$ 103 is connected to the first terminal of a capacitor $C_0$ 104 and the inverting input of an error amplifier (e.g., operational amplifier) 106. The non-inverting input of the error amplifier 106 is coupled to a reference voltage signal, $V_{REF}$ 105. The reference voltage signal, $V_{REF}$ 105, which is coupled to the non-inverting input of the error amplifier 106, has a voltage level that indicates the target voltage level for the output voltage of the buck converter involved. The circuitry including the resistor $R_0$ 103, capacitor $C_0$ 104 and error amplifier 106 functions as an integrator circuit 109, which provides an integrated voltage signal $V_{INTEG}$ at the output of the error amplifier 106 and the node 108. Note that, for example, in a different aspect of this embodiment, the integrator circuit 109 can also be implemented by utilizing an Operational Transconductance Amplifier (OTA) loaded with a capacitor.

The SCF compensation circuit 100 also includes a DDA 110. The DDA 110 includes two input pairs: ($V_{1+}$, $V_{1-}$) and ($V_{2+}$, $V_{2-}$). The integrated voltage (error) signal $V_{INTEG}$ at the node 108 is coupled to the $V_{2+}$ terminal of the DDA 110. A common-mode voltage signal, $V_{CM}$, (e.g., circuit reference voltage which may be different from $V_{REF}$ 105) is coupled to the $V_{1+}$ terminal of the DDA 110. The common-mode voltage signal, $V_{CM}$, which is a DC voltage and an AC ground, is also coupled to a first terminal of a second capacitor, $C_2$ 112. The common-mode voltage signal, $V_{CM}$, functions as a bias point for the DDA 110 to ensure that the DDA 110 operates as required As such, for this exemplary embodiment, the common-mode voltage, $V_{CM}$, can be selected to be mid-rail or (VDD−GND)/2 and can be treated as an AC ground. The second terminal of the second capacitor $C_2$ 112 is coupled to the $V_{1-}$ terminal of the DDA 110, and the voltage feedback signal, $V_{FB}$, is coupled to the $V_{2-}$ terminal of the DDA 110.

The second terminal of the second capacitor, $C_2$ 112, is also coupled to a first terminal of a third capacitor $C_3$ 116, a first terminal of a first transistor (e.g., MOSFET) switch 118a ($\Phi_2$), and a second terminal of a second transistor (e.g., MOSFET) switch 118b ($\Phi_1$). The second terminal of the first transistor switch 118a is coupled to a first terminal of a fourth (switching) capacitor, $C_4$ 120a, 120b and a first terminal of a third transistor (e.g., MOSFET) switch 122a ($\Phi_1$). The second terminal of the fourth capacitor $C_4$ 120a, 120b is coupled to a first terminal of a fourth transistor (e.g., MOSFET) switch 122b ($\Phi_2$). The second terminals of the transistor switches 122a, 122b and the third capacitor $C_3$ 116 are coupled to the output terminal of the DDA 110, which provides an error or compensation voltage signal, $V_{COMP}$, at the output node 114. In the exemplary embodiment shown in FIG. 1, the input pair $V_{1+}$ and $V_{1-}$ and the output of the DDA 110, $V_{COMP}$ encompassed by the capacitors $C_2$ 112, $C_3$ 116, $C_4$ 120a and 120b, and switches 118a, 118b, 122a and 122b function together to provide a negative feedback network. The compensation voltage signal, $V_{COMP}$, at the output of the DDA 110 is coupled to an input of the PWM controller of a DC-DC converter (e.g., to the input of a PWM comparator of a buck converter, as in the embodiment depicted in FIG. 4) to maintain the output voltage of the converter at a substantially constant value. Note that, in this exemplary embodiment, the transistor switches 118a, 118b, 122a, 122b, the third capacitor $C_3$ 116, the (dual) fourth capacitor $C_4$ 120a, 120b, and the DDA 110 are structured to provide a Type-III SCF circuit 101.

In order to implement the Type-III SCF circuit 101 depicted in FIG. 1, a valid assumption can be made that the DDA 110 has an infinite gain. (In addition, since $V_{CM}$ and $V_{REF}$ are DC voltages, the common-mode voltage $V_{CM}=V_{REF}=$AC ground). Consequently, the following relationship can be derived:

$$V_{INTEG} - V_{FB} = 0 - V_2 \quad (1)$$

The integrated voltage signal, $V_{INTEG}$, can be expressed as follows (assuming infinite gain for the error amplifier 106):

$$V_{INTEG} = -\frac{1}{sR_0C_0} \times V_{FB} \quad (2)$$

Mathematically manipulating the voltage signals at the inputs of the DDA 110 produces the following expressions:

$$V_{INTEG} - V_{FB} = \left(-\frac{1}{sR_0C_0} - 1\right) \times V_{FB} = -\left(\frac{1+sR_0C_0}{sR_0C_0}\right) \times V_{FB} \quad (3)$$

$$(V_2 - 0) \times sC_2 = \quad (4)$$
$$(V_{COMP} - V_2) \div \left(R_{EQ4} \parallel \frac{1}{sC_3}\right) = (V_{COMP} - V_2) \div \left(\frac{R_{EQ4}}{1+sC_3R_{EQ4}}\right)$$

$$V_2 \times \left(\frac{R_{EQ4}}{1+sC_3R_{EQ4}}\right) sC_2 = (V_{COMP} - V_2) \quad (5)$$

$$V_2 \times \left[1 + \left(\frac{R_{EQ4}}{1+sC_3R_{EQ4}}\right) sC_2\right] = V_{COMP} \quad (6)$$

$$\therefore V_2 = V_{COMP} \times \frac{1+sC_3R_{EQ4}}{1+sC_3R_{EQ4}+sC_2R_{EQ4}} \quad (7)$$

Substituting Equations (3) and (7) in Equation (1) produces the following expressions:

$$-\left(\frac{1+sR_0C_0}{sR_0C_0}\right) \times V_{FB} = -V_{COMP} \times \frac{1+sC_3R_{EQ4}}{1+sC_3R_{EQ4}+sC_2R_{EQ4}} \quad (8)$$

$$\left(\frac{1+sR_0C_0}{sR_0C_0}\right) \times \frac{1+sC_3R_{EQ4}+sC_2R_{EQ4}}{1+sC_3R_{EQ4}} = \frac{V_{COMP}}{V_{FB}} \quad (9)$$

Note that, as indicated by Equation (9), the manipulation of the transfer functions at the inputs of the DDA 110 produces two poles: one pole is placed at the origin to provide a high level of DC voltage regulation; and the second pole is placed at high frequency. Additionally, two real zeros are placed close to the inductance-capacitance (LC) double-pole frequency present in voltage-mode control. Also note that the term $R_{EQ4}$ in Equation (9) represents the resistor equivalent of the switched capacitor, $C_4$. As such, a bilinear transformation (BLT) can be utilized to convert the continuous-time filter (represented in the Laplace or "s" domain) into a discrete-time filter (represented in the "z" domain), as described directly below.

In order to obtain the discrete-time filter representation of the SCF circuit 100, the BLT equation can be expressed as:

$$s = \frac{2}{T} \times \frac{1-z^{-1}}{1+z^{-1}} \quad (10)$$

Where, T is the sampling time period of the SCF. In the exemplary embodiment depicted in FIG. 1, the sampling period is assumed to be equal to one half of the clock period because double sampling is utilized. Thus, for the embodiment depicted in FIG. 1, the sampling time period, $T=T_{CLK}/2$. Note that only the resistor equivalent, $R_{EQ4}$, of the switching capacitor $C_4$, contributes to the discrete-time filtering function in Equation (9). As such, this discrete-time function is valid from [0, ½T]. The remainder of Equation (9) is valid for all analog frequency values from [0, ∞). However, by selecting the closed-loop cutoff frequency to be substantially smaller than 1/T, the high frequency distortion has minimal impact on the overall transfer function. Thus, Equation (7) can be rewritten in transfer function form:

$$\frac{V_{COMP}}{V_2} = \frac{1 + \frac{C_3}{C_4} \times \frac{1-z^{-1}}{1+z^{-1}} + \frac{C_2}{C_4} \times \frac{1-z^{-1}}{1+z^{-1}}}{1 + \frac{C_3}{C_4} \times \frac{1-z^{-1}}{1+z^{-1}}} \quad (11)$$

The complete frequency response of the transfer function is then obtained by substituting the following in Equation (11):

$$z = e^{j\omega T} \quad (12)$$

In summary, the SCF compensation circuit 101 depicted in FIG. 1 includes a DDA, which realizes a Type-III filter transfer function that enables the cascading of the two transfer functions realized at the differential input pairs of the DDA. Consequently, utilizing the embodiment depicted in FIG. 1 as a discrete-time filter, substantial benefits are derived over those of the existing SCF compensation circuits, such as eliminating the need for the SHA stages and high amplifier bandwidths required, reducing the footprint and power consumption requirements for the dies produced, and enhancing the closed loop performance and stability of the DC-DC (e.g., buck) converters and overall systems involved.

Figure 2:
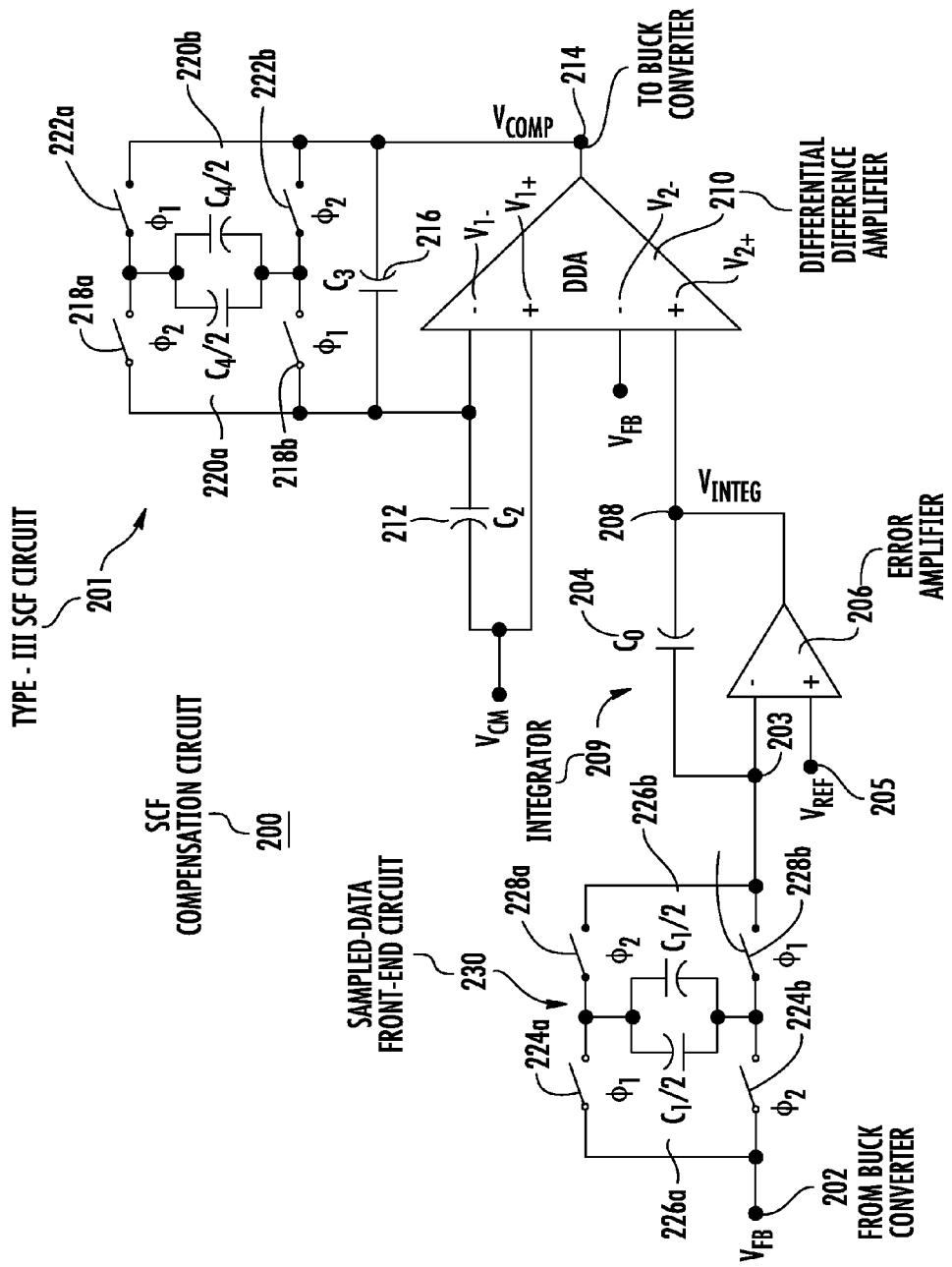
FIG. 2 depicts a schematic circuit diagram of a SCF compensation circuit that can be utilized to implement a second exemplary embodiment of the present invention.

FIG. 2 depicts a schematic circuit diagram of a SCF compensation circuit 200, which can be utilized to implement a second exemplary embodiment of the present invention. For example, the SCF compensation circuit 200 can be utilized to provide Type-III SCF compensation for closed loop regulation in a buck converter. In the exemplary embodiment shown in FIG. 2, the SCF compensation circuit 200 includes a delay-free Type-III SCF circuit 201 with a sampled-data, integrator front-end. As such, the SCF compensation circuit 200 shown in FIG. 2 is a fully-sampled, analog version of the Type-III SCF compensation circuit 100 shown in FIG. 1. Merely by making the SCF sampling time period ($T = T_{SW}/K$) a fraction of the buck converter switching time period ($T_{SW}$), a Type-III filter is realized that is fully-integrated into the buck converter, requires no trimming, and whose transfer function scales linearly with the switching time period $T_{SW}$. Hence, the closed loop stability can theoretically be ensured for any value of $T_{SW}$.

Specifically, the SCF compensation circuit 200 receives a voltage feedback signal, $V_{FB}$, (e.g., from the output node of a buck converter) at an input node 202. The input node 202 is connected to the input terminal of a sampled-data front-end circuit 230 (described in detail below). The output terminal of the sampled-data front-end circuit 230 is coupled to a node 203, which is connected to the first terminal of a capacitor $C_0$ 204 and the inverting input of an error amplifier (e.g., operational amplifier) 206. The non-inverting input of the error amplifier 206 is connected to receive a reference voltage signal, $V_{REF}$ 205. The circuitry including the sampled-data front-end circuit 230, capacitor $C_0$ 204 and error amplifier 206 functions as an integrator circuit 209 to provide an integrated voltage signal $V_{INTEG}$ at the output of the error amplifier 206 and the node 208. As such, and as described in detail below, in this exemplary embodiment, the SCF compensation circuit 200 includes a sampled-data, integrator front-end circuit.

The integrated voltage signal $V_{INTEG}$ at the node 208 is coupled to the $V_{2+}$ input of a DDA 210. The voltage feedback signal, $V_{FB}$, is coupled to the $V_{2-}$ input of the DDA 210. The $V_{1+}$ input of the DDA 210 is coupled to a common-mode voltage signal, $V_{CM}$ (e.g., circuit reference voltage signal). The common-mode voltage signal, $V_{CM}$, which is a DC voltage and an AC ground, is also coupled to a first terminal of a second capacitor, $C_2$ 212. As such, the common-mode voltage signal, $V_{CM}$, functions as a bias point to ensure that the DDA 210 functions as required. For this exemplary embodiment, the common-mode voltage, $V_{CM}$, is selected to be mid-rail or $V_{CM} = (VDD-GND)/2$. The second terminal of the second capacitor $C_2$ 212 is coupled to the $V_{1-}$ input of the DDA 210. The output of the DDA 210 provides a compensation voltage signal, $V_{COMP}$, at the output node 214. In this exemplary embodiment, the output node 214 is coupled to the DC-DC (buck) converter involved.

The second terminal of the second capacitor, $C_2$ 212, is also coupled to a first terminal of a third capacitor $C_3$ 216, a first terminal of a first transistor (e.g., MOSFET) switch 218a ($\Phi_2$), and a second terminal of a second transistor (e.g., MOSFET) switch 218b ($\Phi_1$). The second terminal of the first transistor switch 218a is coupled to a first terminal of a fourth (switching) capacitor, $C_4$ 220a, 220b and a first terminal of a third transistor (e.g., MOSFET) switch 222a ($\Phi_1$). The second terminal of the fourth capacitor $C_4$ 220a, 220b is coupled to a first terminal of a fourth transistor (e.g., MOSFET) switch 222b ($\Phi_2$). The second terminals of the transistor switches 222a, 222b and the third capacitor $C_3$ 216 are coupled to the output node 214. Thus, in this exemplary embodiment, the transistor switches 218a, 218b, 222a, 222b, the (switching) fourth capacitor $C_4$ 220 and the DDA 210 function together to provide a Type-III SCF 201.

In this embodiment, the sampled-data, front-end circuit 230 receives the feedback voltage signal, $V_{FB}$, at a first terminal of a fifth transistor (e.g., MOSFET) switch 224a ($\Phi_1$), and a first terminal of a sixth transistor (e.g., MOSFET) switch 224b ($\Phi_1$). The second terminal of the fifth transistor switch 224a is coupled to a first terminal of a switching capacitor, $C_1$ 226a, 226b and a first terminal of a seventh transistor (e.g., MOSFET) switch 228a ($\Phi_2$). The second terminal of the switching (fifth) capacitor $C_1$ 226a, 226b is coupled to the second terminal of the sixth transistor switch 224b and a first terminal of an eighth transistor (e.g., MOSFET) switch 228b ($\Phi_2$). The second terminal of the eighth transistor switch 228b is coupled to the second terminal of the seventh transistor switch 228a and the node 203. Thus, the Type-III SCF 200 includes a sampled-data circuit (230) and integrator circuit (209) front-end.

In this exemplary embodiment, both of the switching capacitors, $C_1$ 226 and $C_4$ 220, can be implemented as equivalent resistors $R_{EQ1}$ and $R_{EQ4}$, respectively, in the discrete-time domain. Therefore, assuming that Equations (1)-(8) above can also apply for this embodiment, Equation (9) can be rewritten and thus expressed as follows:

$$\frac{V_{COMP}}{V_{FB}} = \left(\frac{1 + sR_{EQ1}C_0}{sR_{EQ1}C_0}\right) \times \frac{1 + sC_3R_{EQ4} + sC_2R_{EQ4}}{1 + sC_3R_{EQ4}} \quad (13)$$

As such, for this embodiment, in the discrete time domain, Equation (13) can be expressed as follows:

$$\frac{V_{COMP}}{V_{FB}} = \left(\frac{1 + \frac{C_0}{C_1} \times \frac{1-z^{-1}}{1+z^{-1}}}{\frac{C_0}{C_1} \times \frac{1-z^{-1}}{1+z^{-1}}}\right) \times \frac{1 + \frac{C_3}{C_4} \times \frac{1-z^{-1}}{1+z^{-1}} + \frac{C_2}{C_4} \times \frac{1-z^{-1}}{1+z^{-1}}}{1 + \frac{C_3}{C_4} \times \frac{1-z^{-1}}{1+z^{-1}}} \quad (14)$$

Again, the complete frequency response of this transfer function can be obtained by substituting Equation (12) above in Equation (14).

In summary, the Type-III SCF compensation circuit 200 depicted in the embodiment of FIG. 2 realizes all of the enhancements described above with respect to the embodiment depicted in FIG. 1. Additionally, the sampled-data front end circuit 230 in the embodiment depicted in FIG. 2 can be utilized to directly sample the feedback voltage at the output of the DC-DC (buck) converter involved. This function can be implemented especially where the buck converter's ripple voltage is small (and especially when ceramic output capacitors are utilized). However, the implicit low-pass filtering of the switching capacitor integrator in this embodiment prevents aliasing distortion (and thus eliminates the need for an Anti-Aliasing Filter) even if the ripple voltage is high.

Figure 3:
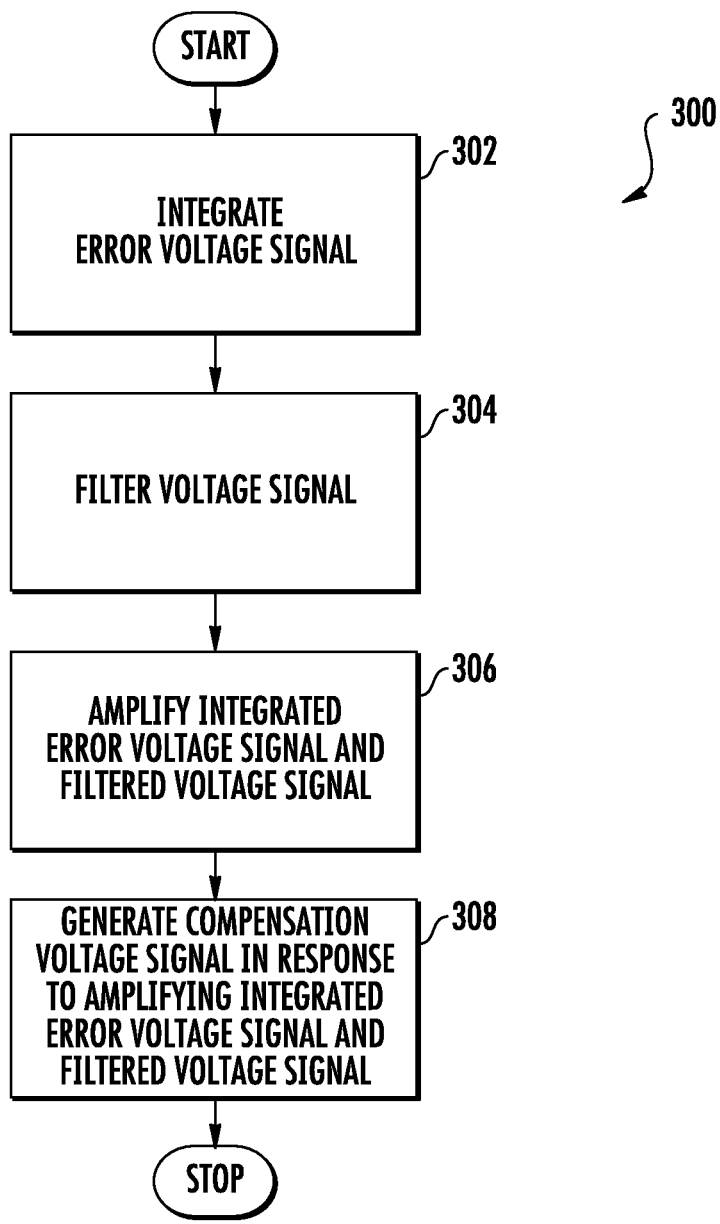
FIG. 3 depicts a flow diagram of a method that can be utilized to implement Type-III SCF compensation for a DC-DC converter, in accordance with one exemplary embodiment of the present invention.

FIG. 3 depicts a flow diagram of a method 300, which can be utilized to implement Type-III SCF compensation for a DC-DC converter, in accordance with one exemplary embodiment of the present invention. In this embodiment, the method 300 is utilized to implement SCF compensation for a buck converter. However, in other embodiments, the method 300 can also be utilized to implement SCF compensation for other suitable types of voltage converters in which SCF compensation is desired. Referring to FIGS. 1 and 3, the exemplary method 300 begins by integrating an error voltage signal generated at the output node 108 of the integrator 109 (302). The integrated error voltage signal, which is derived from the feedback voltage, $V_{FB}$, received at the input terminal 102, is coupled to the $V_{2+}$ differential input of the DDA 110. The SCF 101 filters a voltage signal (304) associated with the common-mode voltage, $V_{CM}$, and thereby generates a filtered voltage signal at the $V_{1-}$ differential input of the DDA 110. The DDA 110 amplifies the integrated error voltage signal and the filtered voltage signal (306), and generates at its output (and the output node coupled to the buck converter) 114 a compensation voltage signal in response to amplifying the integrated voltage signal and the filtered voltage signal at the respective inputs to the two differential input pairs (308). More precisely, the compensation voltage signal at the output 114 of the DDA 110 is the difference between the voltage signals received at the two differential input pairs. As such, the DDA 110 functions implicitly to cascade the transfer functions of the voltage signals realized at the two differential input pairs.

Figure 4:
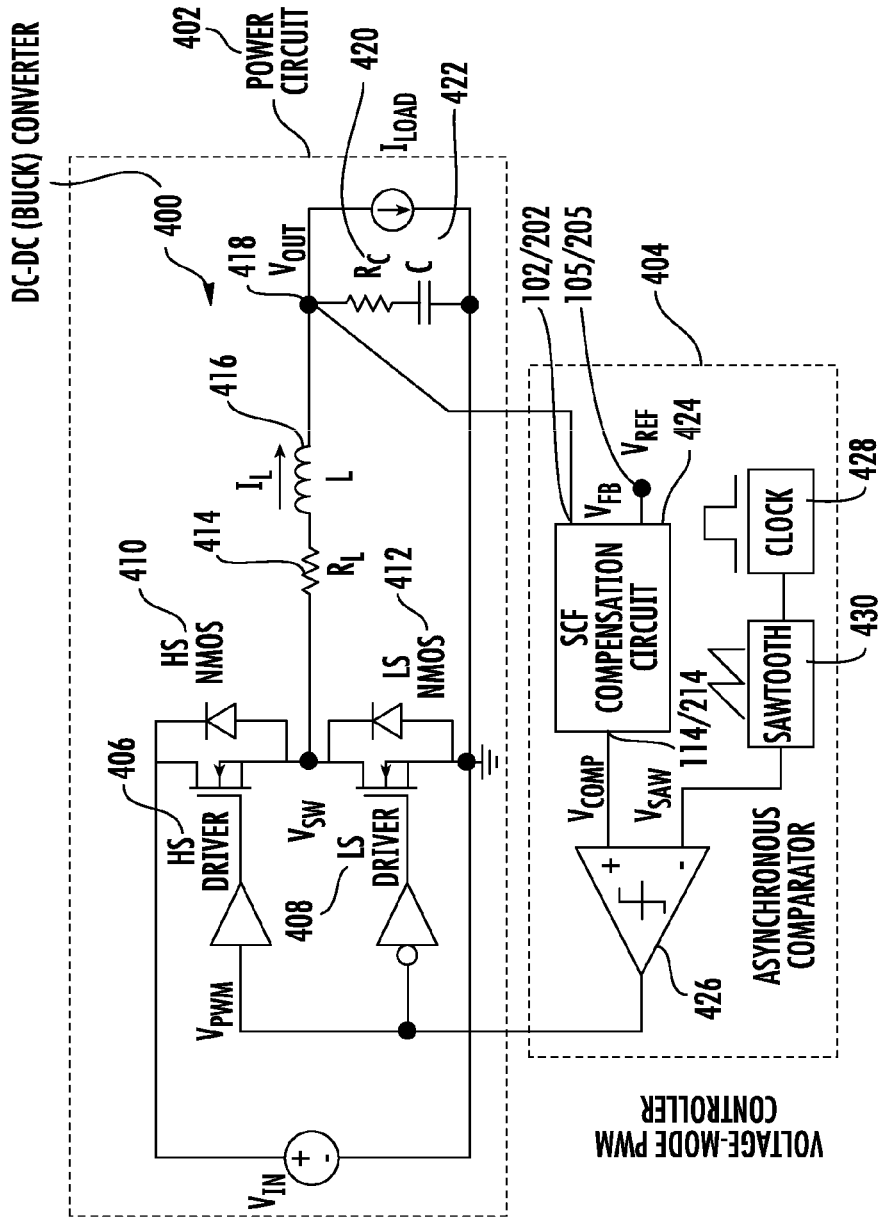
FIG. 4 depicts a schematic circuit diagram of a DC-DC converter that can be utilized to implement Type-III SCF compensation, in accordance with one exemplary embodiment of the present invention.

FIG. 4 depicts a schematic circuit diagram of a DC-DC converter 400, which can be utilized to implement one exemplary embodiment of the present invention. In the exemplary embodiment shown, the DC-DC converter 400 is a voltage-mode controlled buck converter with Type-III SCF compensation. In a second embodiment, the DC-DC converter 400 can be a boost converter or a buck-boost converter with Type-III SCF compensation. Referring to the exemplary embodiment depicted in FIG. 4, the buck converter 400 includes a power circuit 402 and a voltage-mode PWM controller circuit 404. In this exemplary embodiment, the power circuit 402 and controller circuit 404 are formed on separate integrated circuits, wafers, chips or dies. In a second embodiment, the power circuit 402 and controller circuit 404 can be formed on a single integrated circuit, wafer, chip or die.

In the embodiment depicted in FIG. 4, the power circuit 402 includes a high side driver amplifier 406 and a low side driver amplifier 408. The input terminals of the driver amplifiers 406, 408 are coupled to the output of the controller circuit 404. The output terminals of the high side driver amplifier 406 and low side driver amplifier 408 are coupled, respectively, to the control terminals of a high side switching (e.g., NMOS) transistor 410 and low side switching (e.g., NMOS) transistor 412. The switching voltage, $V_{SW}$, at the output node between the switching transistors 410, 412 is coupled to and developed across the resistor, $R_L$ 414. The voltage developed across the resistor, $R_L$ 414 is coupled to the inductor, L 416, which in turn generates the inductor current, $I_L$. The output voltage of the power circuit 402 is developed at the output node, $V_{OUT}$ 418, and filtered by the RC network 420, 422.

The voltage, $V_{OUT}$, at the output node 418 of the power circuit 402 is coupled to the feedback voltage input, $V_{FB}$ in the SCF compensation circuit 424. For example, referring to FIG. 1, the voltage $V_{OUT}$ can be coupled to the feedback voltage input, $V_{FB}$ 102 depicted in that embodiment, or alternatively, referring to FIG. 2, the voltage $V_{OUT}$ can be coupled to the feedback voltage input, $V_{FB}$ 202 in the SCF compensation circuit 200 depicted in that embodiment. The compensation voltage signal, $V_{COMP}$, at the output of the SCF compensation circuit 424 is coupled to the non-inverting input terminal of a PWM comparator 426. For example, referring to FIG. 1, the voltage $V_{COMP}$ can be coupled to the power circuit 402 from the output terminal 114 in the SCF compensation circuit 100 depicted in that embodiment, or alternatively, referring to FIG. 2, the voltage $V_{COMP}$ can be coupled to the power circuit 402 from the output terminal 214 in the SCF compensation circuit 200 depicted in that embodiment. The voltage-mode PWM controller circuit 404 also includes a clock circuit 428, which generates a clock (timing) pulse. The clock pulse is coupled to a sawtooth generator circuit 430, which generates a sawtooth voltage signal, $V_{SAW}$ that is coupled to the inverting input terminal of the PWM comparator 426. The PWM voltage signal, $V_{PWM}$ thus generated at the output of the PWM comparator 426 and the output terminal of the voltage-mode PWM controller 404 is coupled to the respective input terminals of the high side and low side driver amplifiers 406, 408 in the power circuit 402.

Figure 5:
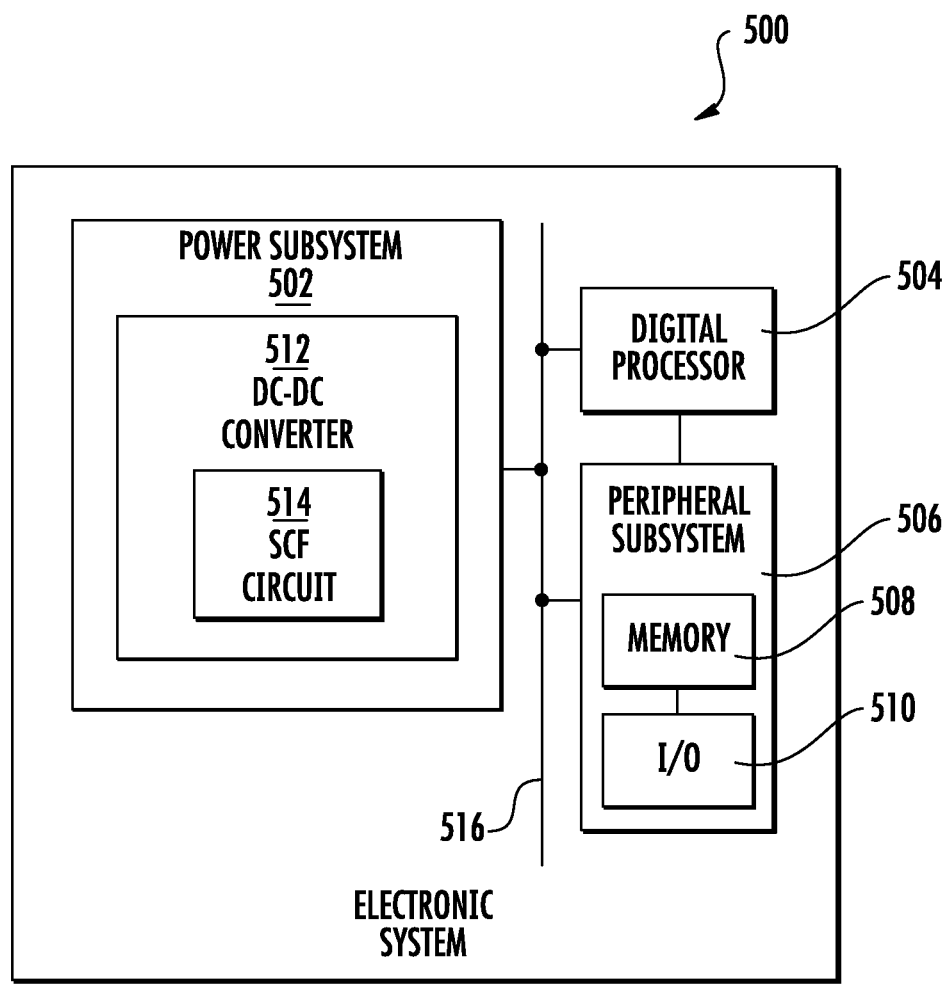
FIG. 5 depicts a schematic block diagram of an electronic system that can be utilized to implement one exemplary embodiment of the present invention.

FIG. 5 depicts a schematic block diagram of an electronic system 500, which can be utilized to implement one exemplary embodiment of the present invention. In the exemplary embodiment shown, electronic system 500 includes a power subsystem 502, a digital processor unit 504, and a peripheral subsystem 506. For example, the digital processor unit 504 can be a microprocessor or microcontroller and the like. The peripheral subsystem 506 includes a memory unit 508 for storing the data processed by the digital processor unit 504, and an input/output (I/O) unit 510 for transmitting and receiving the data to/from the memory unit 508 and the digital processor unit 504. In the exemplary embodiment depicted in FIG. 5, the power subsystem 502 includes a DC-DC converter 512, and an SCF compensation circuit 514 for closed loop regulation of the converter 512. For example, the DC-DC converter 512 can be implemented utilizing the DC-DC (buck) converter 400 depicted in FIG. 4, and the SCF compensation circuit 514 can be the SCF compensation circuit 424 depicted in FIG. 4. The DC-DC converter 512 and power subsystem 502 provide a regulated voltage via line 516 to power the electronic components in the digital processor unit 504 and peripheral subsystem 506. In the exemplary embodiment shown in FIG. 5, the SCF compensation circuit 514 can be implemented, for example, utilizing the Type-III SCF compensation circuit 100 depicted in FIG. 1, or alternatively, utilizing the fully sampled, Type-III SCF compensation circuit 200 depicted in FIG. 2. In one or more embodiments, the components of the electronic system 500 can be implemented in one or more integrated circuits, wafers, chips or dies.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that the present application be limited only by the claims and the equivalents thereof.

What is claimed is:

1. A compensation circuit, comprising:
   an integrator circuit configured to receive and integrate a first voltage signal;
   a differential difference amplifier circuit coupled to the integrator circuit and configured to generate a first filter transfer function associated with the integrated first voltage signal; and
   a switched capacitor filter circuit coupled to the differential difference amplifier circuit and configured to generate a second filter transfer function, wherein the differential difference amplifier is further configured to output a second voltage signal responsive to the first filter transfer function and the second filter transfer function.

2. The compensation circuit of claim 1, wherein the compensation circuit comprises a type-III switched capacitor filter compensation circuit for a DC-DC converter.

3. The compensation circuit of claim 1, wherein the integrator circuit comprises a continuous-time integrator front-end circuit.

4. The compensation circuit of claim 1, wherein the integrator circuit comprises a switched capacitor integrator circuit.

5. The compensation circuit of claim 1, wherein the switched capacitor filter circuit comprises a type-III switched capacitor filter circuit.

6. The compensation circuit of claim 1, wherein the differential difference amplifier includes a first input configured to receive the integrated first voltage signal, a second input configured to receive the first voltage signal, a third input configured to receive a common-mode voltage signal, and a fourth input configured to receive a filtered voltage signal associated with the common-mode voltage signal.

7. The compensation circuit of claim 1, wherein the differential difference amplifier circuit includes two pairs of differential inputs.

8. The compensation circuit of claim 1, wherein the differential difference amplifier circuit is configured to realize a type-III filter transfer function that enables an implicit cascading of transfer functions received at two pairs of differential inputs of the differential difference amplifier.

9. A DC-DC voltage converter, comprising:
   a power circuit; and
   a controller circuit coupled to the power circuit, the controller circuit including a compensation circuit comprising:
   an integrator circuit configured to receive an output voltage from the DC-DC voltage converter and integrate the output voltage signal;
   a differential difference amplifier circuit coupled to the integrator circuit and configured to generate a first filter transfer function associated with the integrated output voltage signal; and
   a switched capacitor filter circuit coupled to the differential difference amplifier circuit and configured to generate a second filter transfer function, wherein the differential difference amplifier is further configured to generate a compensation voltage signal for the DC-DC voltage converter responsive to the first filter transfer function and the second filter transfer function.

10. The DC-DC voltage converter of claim 9, wherein the DC-DC voltage converter comprises a switched mode PWM voltage converter.

11. The DC-DC voltage converter of claim 9, wherein the DC-DC voltage converter comprises a buck converter or step-down voltage converter.

12. An electronic system, comprising:
   a digital processor;
   a peripheral subsystem coupled to the digital processor; and
   a power subsystem coupled to the digital processor and circuit components of the peripheral subsystem and configured to generate an output voltage to power the digital processor and the circuit components of the peripheral subsystem, wherein the power subsystem includes a DC-DC converter configured to regulate the output voltage of the power subsystem, and the DC-DC converter includes a switched capacitor filter compensation circuit comprising:
   an integrator circuit configured to receive and integrate a difference of the output voltage and a reference voltage;
   a differential difference amplifier circuit coupled to an output of the integrator circuit and configured to generate a first filter transfer function; and
   a switched capacitor filter circuit coupled to the differential difference amplifier circuit and configured to generate a second filter transfer function, wherein the differential difference amplifier is further configured to output a compensation voltage signal for the DC-DC converter responsive to the first filter transfer function and the second filter transfer function.

13. The electronic system of claim 12, wherein the DC-DC converter comprises a buck converter.

14. The electronic system of claim 12, wherein the switched capacitor filter compensation circuit and the power subsystem are formed on one or more integrated circuits, wafers, chips or dies.

* * * * *